United States Patent

Batelaan

[11] Patent Number: 5,678,903
[45] Date of Patent: Oct. 21, 1997

[54] SHORT TRACK WHEEL

[76] Inventor: Joost Batelaan, 25 Charterhouse Rd., Scarborough, Ont., Canada, M1S 2T4

[21] Appl. No.: 687,583
[22] PCT Filed: Feb. 10, 1995
[86] PCT No.: PCT/CA95/00078
 § 371 Date: Aug. 12, 1996
 § 102(e) Date: Aug. 12, 1996
[87] PCT Pub. No.: WO95/21761
 PCT Pub. Date: Aug. 17, 1995

[30] Foreign Application Priority Data

Feb. 15, 1995 [CA] Canada .................. 2115697

[51] Int. Cl.⁶ .................................................. B62D 55/18
[52] U.S. Cl. .................................... 305/167; 305/185
[58] Field of Search ................................. 305/165, 167, 305/185, 35 R, 38, 39

[56] References Cited

U.S. PATENT DOCUMENTS

| 2,055,932 | 9/1936 | Kitchen ............... 305/31 |
| 2,661,249 | 12/1953 | Bonmartini .......... 305/157 |
| 3,619,012 | 11/1971 | Bizier et al. ........ 305/168 |
| 4,378,133 | 3/1983 | Trautwein ......... 305/165 X |
| 4,386,809 | 6/1983 | Lapsys ................ 305/31 |
| 4,957,332 | 9/1990 | Batelaan ............. 305/39 |

FOREIGN PATENT DOCUMENTS

| 565512 | 1/1924 | France . |
| 68894 | 6/1892 | Germany . |
| 1480857 | 5/1969 | Germany . |
| 438805 | 8/1948 | Italy .................... 305/39 |
| 1643295 | 4/1991 | U.S.S.R. ............. 305/39 |
| 1146850 | 3/1969 | United Kingdom . |

*Primary Examiner*—Russell D. Stormer
*Attorney, Agent, or Firm*—Ronald G. Bitner

[57] ABSTRACT

A track wheel having a self supporting track (1) mounted on a pair of load bearing rollers (2, 3). The track (1) comprises a continuous resilient band having a preformed transverse and longitudinal curvature for resisting flattening to a larger radius under load but substantially free to bend to a smaller radius of curvature for passage around the rollers. The radius (8) of transverse curvature is made approximately equal to the radius (7) of said rollers, and the radius (15) of longitudinal curvature is made not greater than 20 times the radius (8) of the transverse curvature to provide a short track wheel having a high load capacity and large surface contacting area or footprint.

5 Claims, 1 Drawing Sheet

SHORT TRACK WHEEL

FIELD OF THE INVENTION

This invention relates to a resilient suspension device for a vehicle and more particularly to a short track wheel comprising a resilient band entraining a pair of rollers.

BACKGROUND OF THE INVENTION

Conventional tracked suspension devices utilize a pair of outer rollers and a number of intermediate support rollers. This type of tracked device is relatively complex and exhibits high rolling resistance.

Tracked devices using resilient endless bands are known, and examples of such devices are disclosed in U.S. Pat. No. 2,055,932 to Kitchen, U.S. Pat. No. 4,386,809 to Lapsys, and in the present inventor's prior U.S. Pat. No. 4,957,332. The bands or tracks of such devices function as a resilient suspension device which provide an extensive area of contact between the track and the supporting surface.

However, the load supporting capacity of the known devices is limited. It would be desirable if a resilient track wheel was capable of supporting a large vehicle load while providing a large area of contact between the track and supporting surface.

SUMMARY OF THE INVENTION

It is an object of the present invention to provide a track wheel with a large load carrying capacity while also having a large footprint in soft ground.

A further object of one embodiment of the invention is to provide a track wheel with small overall size and small mass while also having a relatively large footprint in soft ground.

The load supporting capacity of a spring track is mainly a function of its material properties, its curvatures and its length. In the present inventor's prior U.S. Pat. No. 4,957,332, the limit of the track curvature and length is expressed in terms of a track arc angle between rollers of 15°, or greater. It has now been determined that tracks with a relatively small arc, and specifically with an arc smaller than 15°, can support a heavy load provided the longitudinal curvature radius is less than 20 times the transverse curvature radius. The flatter, or large radius small arc portion between rollers provides an increased surface contacting area, or footprint.

It has also been found that the load on a track wheel, with preferred radii, can be increased until the track segment, with highest bending load, is bent straight, beyond which the track buckles. The resistance to bending of a thin, dual curved band, such as employed by the present invention, is dependant on the transverse and longitudinal curvatures of the band, and properties of the material used. Specifically, the track band will bend to a straight segment at maximum load, when R/r=E/12S, where R and r are the radii of the initial, or unloaded, longitudinal and transverse curvatures, respectively, and E is the Modulus of Elasticity of the material, and S is the highest acceptable material stress (yield point). With R/r radii ratios higher than 1/12 times the E/S ratio, the band will deflect beyond a straight line, and buckle, before the yield point is reached and the load is less than the maximum possible load.

In accordance with the present invention there is provided a self supporting spring track for mounting on a pair of load bearing rollers, said track comprising a continuous resilient band having a preformed transverse and longitudinal curvature for resisting flattening to a larger radius under load but substantially free to bend to a smaller radius of curvature for passage around said rollers, and wherein the radius of said transverse curvature is substantially equal to the radius of said rollers, and the radius of said longitudinal curvature is from 2.2 to 20 times the radius of said transverse curvature, in the unmounted and unconfined state of the track.

DESCRIPTION OF THE PREFERRED EMBODIMENTS

Figure 2:
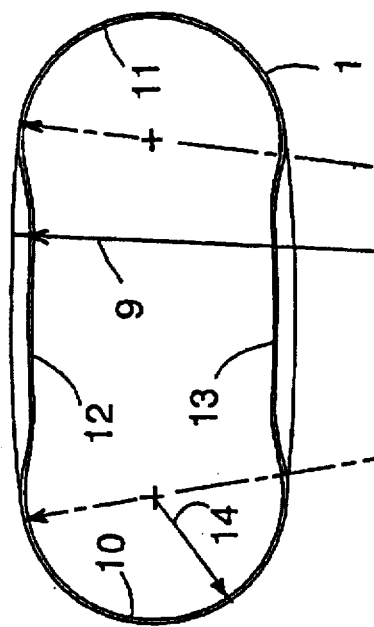
FIG. 2 is a side view of an unmounted band for the track wheel of FIG. 1.
Figure 1:
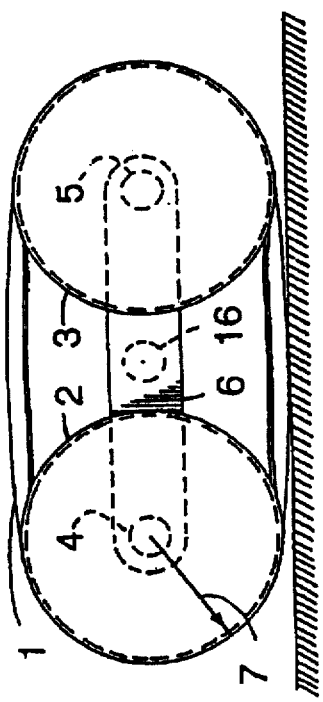
FIG. 1 is a schematic side elevational view of a track wheel of this invention.

With reference to the drawings, the track wheel of the present invention comprises a resilient band 1 mounted on a pair of rollers 2 and 3. The rollers 2 and 3 are rotatably mounted on axles 4 and 5, respectively, which are secured to a frame 6. The band 1 has a preformed transverse curvature of radius 8, best seen in FIG. 3, and a preformed longitudinal curvature of radius 9, best seen in FIGS. 2 and 4. Both the transverse and longitudinal curvatures have their concave surfaces directed towards the center.

Figure 4:
FIG. 4 is a side view of the band of FIG. 2, at reduced scale, shown with the loop cut.

FIG. 2 shows the geometrical configuration of the band 1, when unmounted and unconfined, while FIG. 4 shows the configuration of the same band, at reduced scale, with the loop cut.

The track band forms a natural oval loop with a geometrical configuration that is determined by the preformed transverse and longitudinal curvatures.

With reference to FIG. 2, the unconfined band, thus formed, defines two opposite small radius arc portions 10 and 11 and two opposite large radius arc portions 12 and 13. The radius 14 of the small radius arc portions 10 and 11 is determined by the radius 8 of transverse curvature, while the radius 9 of the large radius arc portions is determined by the preformed longitudinal curvature. The band retains the same oval geometry, as a point on the band traverses the loop.

The band 1 is formed with a transverse curvature having a radius 8 that is approximately equal to the radius 7 of the rollers, so that the two small radius arc portions 10 and 11 of the loop are provided with a radius approximately equal to that of the rollers 2 and 3. This assures effective transfer of vehicle load from the rollers to the track without adding to the stresses in these portions of the loop.

To avoid undue stresses, the roller radii should not be smaller than the transverse curvature radius. However, in some applications, a roller radius slightly larger than the transverse radius may be advantageous in allowing use of a thicker band with a higher loading capacity.

In accordance with the present invention, the radius of the longitudinal curvature should be less than 20 times the radius 8 of the transverse curvature, and the large radius arc portions 12 and 13 should be less than 15°. This provides a short track wheel with a relatively high load carrying capacity, compared with prior track wheels. The minimum practical radii ratio is about 2.2, which is nearly circular. A preferred range of longitudinal curvature is a radius of from 2.5 to 15 times that of the radius of transverse curvature, in the unmounted and unconfined state of the track.

The track wheel as illustrated in the drawings employs a longitudinal/transverse radius ratio of about 14/1, and the large radius portion between the rollers defines an arc 15, of 12°.

In a preferred embodiment of the invention, the large radius portions 12 and 13 between the rollers define an arc of less than 15°. This provides a relatively short and flat arc portion between rollers for an increased load capacity and large footprint.

The present invention provides a track wheel with a ground or surface engaging portion having a large footprint equivalent to that of a wheel with diameter many times the height of track while maintaining a curved surface unsupported by bogey wheels or support rollers found in conventional tracked vehicle.

The track forming band 1 is a endless or continuous loop formed of a resilient spring-like material such as spring steel or a fiber reinforced polymer composite.

The load capacity of a track band is reached when any part of the track band bends under load to a straight segment or when the material stress limit is reached. If the initial longitudinal radius is the limiting factor, a further increase in the load will cause the band to buckle. The resistance to bending of a thin, dual curved band, such as employed by the present invention, is dependant on the transverse and longitudinal curvatures of the band, and properties of the material used. Specifically, the track band will bend to a straight segment at maximum load, when R/r=E/12S, where R and r are the radii of the initial, or unloaded, longitudinal and transverse curvatures, respectively, and E is the Modulus of Elasticity of the material, and S is the highest acceptable material stress limit, specifically, the yield point of the material. With R/r radii ratios higher than 1/12 times the E/S ratio, the band will bend beyond a straight segment, and buckle, before the yield point is reached and the load is less than the maximum possible load.

Most spring steel materials have an E of about 200 GPa, and a yield point of about 1.2 GPa. Hence, a steel track with R equal to about 14 r will bend to a straight segment when the load caused a stress approaching the yield point. Tracks with R greater than 14 r, for example at 20 r, will bend beyond a straight segment and buckle when the load causes a stress of about 70% of the yield point.

For a band composed of fibre reinforced polymer composite materials the maximum radii ratio is about 5 to 10.

For maximum load carrying capacity the ratio between the radii of the longitudinal curvature and the transverse curvature should not be greater than 1/12 of the ratio between the modulus of elasticity and the yield point of the band material. However, practical uses may be made of tracks with larger radii ratios. For example, for some applications, a larger footprint with reduced, but acceptable load capacity, can be obtained with a radii ratio of 20. In such case the ratio of the radii of the longitudinal curvature and the transverse curvature is about 1/8 of the ratio between the modulus of elasticity and the yield point of the band material.

The band thickness is limited by the fatigue strength of the material. A maximum thickness is preferred to provide a maximum load carrying capacity. The preferred band width is about equal to the transverse radius. Larger band width will cause excessive stress in the edges of the band and a smaller band width will reduce the load carrying capacity.

Materials used for the spring track should have a high flexural fatigue strength and a low hysteresis loss factor. Rolling resistance of the spring track will increase with a higher hysteresis loss factor. This factor is a measure of the power dissipated as heat when the material is flexed or deformed. In general, materials used for springs will be suitable for use as spring tracks. Reinforced plastic containing filaments such as Kevlar™ are also suitable. A rubber coating is preferably provided on the outer surface of the track.

Figure 3:
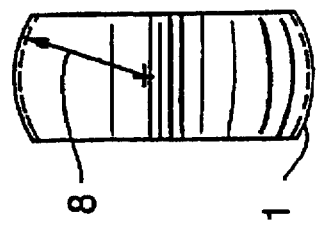
FIG. 3 is an end view of the track of FIG. 2.

FIG. 3 shows an end view of an embodiment of the invention with a circular curvature and with uniform thickness. Curvatures other than circular, e.g. hyperbolic or parabolic, and non uniform section thickness, may also be used to obtain the desired longitudinal curvature limiting, load carrying characteristics.

The track wheel may be attached to a vehicle directly to the axles 4 and 5, or to the intermediate frame member 6, at a suitable point such as 16.

A track wheel in accordance with the present invention is suited for, but not limited to, applications such as farm tractors, snow vehicles, landing wheels on aircraft and all terrain wheelchairs.

For example a short track wheel with a spring steel track can replace a dual set of 2.5 m diameter wheels on a large 4 wheel drive agricultural tractor. The four track wheels, with a length of 1.8 m between centres of rollers and a transverse curvature radius of 0.75 m, and with with large radius arc segments of less than 10°, can support a load of about 40 kN each on soft terrain with less than 30 kPa of ground pressure. This means the tractor with four track wheels can generate more drawbar power at a greater fuel efficiency and with less soil compaction. A track wheel designed with large radius arc segments of 15° or more will have a load capacity in soft soil of less than 27 kN, as compared with 40 kN obtainable with a track wheel having large radius arc segments of 10°.

What is claimed is:

1. A self supporting track (1) for mounting on a pair of load bearing rollers (2,3), said track comprising a continuous resilient band (1) having a preformed transverse and longitudinal curvature for resisting flattening to a larger radius under load but substantially free to bend to a smaller radius of curvature for passage around said rollers (2,3), and the radius (8) of said transverse curvature is approximately equal to the radius (7) of said rollers, and the radius (9) of said longitudinal curvature is from 2.2 to 20 times the radius (8) of said transverse curvature, in the unmounted and unconfined state of the track; wherein the band (1), in its unloaded and unconfined state, defines two opposite large radius arc portions (12, 13) and two opposite smaller radius are portions (10, 11), and wherein the large radius portion (12) between the rollers defines an arc (15) of less than 15°.

2. The apparatus of claim 1 wherein the radius (9) of the longitudinal curvature is from 2.5 to 15 times that of the radius (8) of transverse curvature, in the unmounted and unconfined state of the track.

3. The apparatus of claim 1 wherein the radius (8) of said transverse curvature is not greater than the radius (7) of said rollers (2, 3).

4. The apparatus of claim 1 wherein the ratio between the longitudinal curvature radius (9) and the transverse curvature radius (8) is not greater than 1/20 of the ratio between the modulus of elasticity and the yield point of the band material.

5. The apparatus of claim 1 wherein the ratio between the longitudinal curvature radius (9) and the transverse curvature radius (8) is not greater than about 1/12 of the ratio between the modulus of elasticity and the yield point of the band material.

* * * * *